(12) United States Patent
Alexander

(10) Patent No.: US 6,318,611 B1
(45) Date of Patent: Nov. 20, 2001

(54) CAR SEAT NETTING SYSTEM

(76) Inventor: David P. Alexander, 1971 W. Lumsden Rd., #124, Brandon, FL (US) 33511

( * ) Notice: Subject to any disclaimer, the term of this patent is extended or adjusted under 35 U.S.C. 154(b) by 0 days.

(21) Appl. No.: 09/633,774

(22) Filed: Aug. 7, 2000

(51) Int. Cl.⁷ .................................................. B60R 7/04
(52) U.S. Cl. ...................... 224/275; 224/572; 296/37.15; D12/416
(58) Field of Search .................................. 224/275, 539, 224/560, 561, 572; 296/37.15, 37.16; D12/416

(56) References Cited

U.S. PATENT DOCUMENTS

| | | | |
|---|---|---|---|
| D. 415,730 | * 10/1999 | Jocobsmeyer | D12/416 |
| 2,369,552 | * 2/1945 | Ferran . | |
| 3,081,865 | * 3/1963 | Pugsley . | |
| 3,436,770 | * 4/1969 | Turner . | |
| 4,254,872 | * 3/1981 | Garrett . | |
| 4,949,890 | * 8/1990 | Schultz | 224/275 |
| 5,007,569 | * 4/1991 | Zarb | 224/275 |
| 5,209,386 | * 5/1993 | Allison | 224/275 |
| 6,135,546 | * 10/2000 | Demtchouk | 224/275 X |

* cited by examiner

Primary Examiner—Gregory M. Vidovich

(57) ABSTRACT

A car seat netting system has a pair of front posts each having a lower tube with an upper tube adjustably positioned about the lower tube. The tubes are positionable adjacent the front left corner and front right corner of the front right passenger seat of a vehicle. The left side edge of a front screen is secured to the upper left tube and the right edge is secured to the upper right tube. The front edge of a right screen is permanently secured to the upper right tube. The upper, front and rear edges of a left screen have an aligned row of snaps. A supplemental border in an inverted U-shaped configuration has a front edge permanently secured to the front left tube and a free top edge and rear edge with a plurality of aligned spaced snaps adapted to removably couple with the snaps of the left screen and a supplemental row of aligned snaps along the rear edge of the supplemental border. A plurality of straps have right ends permanently secured to the rear edge of the right screen. Snaps secured to the left ends of the straps are adapted to releasably couple to the supplemental row of snaps of the supplemental border.

4 Claims, 3 Drawing Sheets

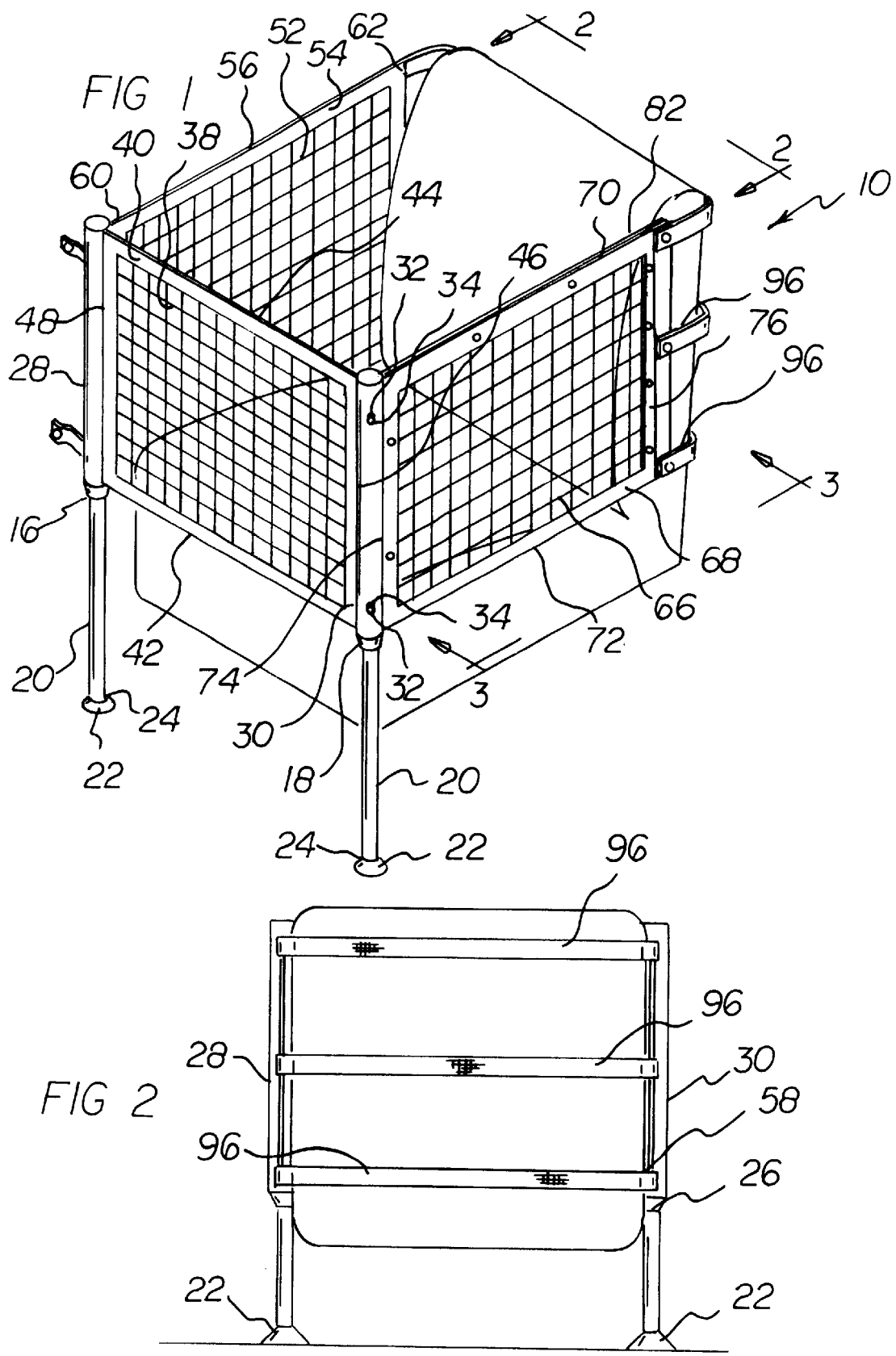

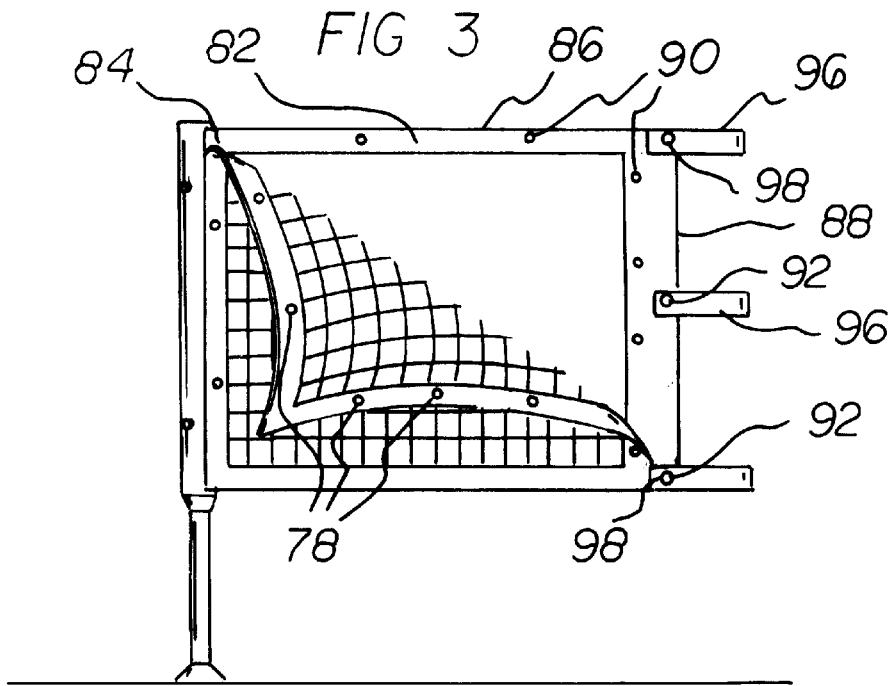
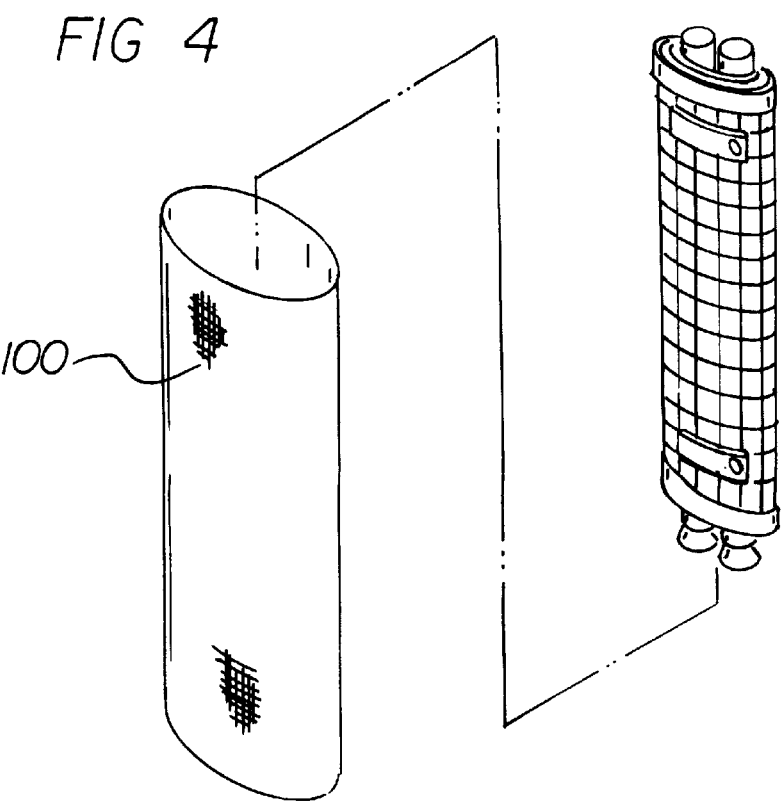

CAR SEAT NETTING SYSTEM

BACKGROUND OF THE INVENTION

1. Field of the Invention

The present invention relates to a car seat netting system and more particularly pertains to precluding inadvertent movement of objects on the front right passenger seat of a vehicle.

2. Description of the Prior Art

The use of car safety systems of known designs and configurations is known in the prior art. More specifically, car safety systems of known designs and configurations previously devised and utilized for the purpose of abating unintended movement of objects within vehicles are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,633,936 to Huber discloses an automatically deployed occupant restraint system. U.S. Pat. No. 4,635,962 to Miyada discloses an inertial safety system for cars. Lastly, U.S. Pat. No. 4,708,384 to LaRosa discloses a protective automobile partition.

While these devices fulfill their respective, particular objectives and requirements, the aforementioned patents do not describe car seat netting system that allows precluding inadvertent movement of objects on the front right passenger seat of a vehicle.

In this respect, the car seat netting system according to the present invention substantially departs from the conventional concepts and designs of the prior art, and in doing so provides an apparatus primarily developed for the purpose of precluding inadvertent movement of objects on the front right passenger seat of a vehicle.

Therefore, it can be appreciated that there exists a continuing need for a new and improved car seat netting system which can be used for precluding inadvertent movement of objects on the front right passenger seat of a vehicle. In this regard, the present invention substantially fulfills this need.

SUMMARY OF THE INVENTION

In view of the foregoing disadvantages inherent in the known types of car safety systems of known designs and configurations now present in the prior art, the present invention provides an improved car seat netting system. As such, the general purpose of the present invention, which will be described subsequently in greater detail, is to provide a new and improved car seat netting system and method which has all the advantages of the prior art and none of the disadvantages.

To attain this, the present invention essentially comprises a car seat netting system. First provided, as part of the system, are a pair of front posts. Each front post has a lower tube. The lower tube has a support foot at the lower end. The lower tube has a top end. Each front post also has an upper tube adjustably positioned about the lower tube. A plurality of circular apertures are located through each upper tube at spaced locations. An associated spring urged button extends through the apertures to secure the upper tube at a predetermined height with respect to the lower tube. The tubes are positionable adjacent the front left corner and front right corner of the front right passenger seat of a vehicle. Next provided is a front screen. The front screen is in a rectangular configuration. The front screen has an imperforate peripheral border forming a lower edge and an upper edge and parallel side edges between the upper and lower edges. The side edges include a left side edge permanently secured to the upper left tube. The side edges also include a right edge secured to the upper right tube. The front screen is positioned between the lower edge, upper edge and side edges. Next provided is a right screen. The right screen is in a rectangular configuration. The right screen has an imperforate peripheral border. The peripheral border of the right screen has an upper edge, a lower edge, a front edge, and a rear edge. The front edge is permanently secured to the upper right tube. Next provided is a left screen. The left screen also has a peripheral border. The peripheral border of the left screen has an upper edge, a lower edge, a front edge, and a rear edge. The borders adjacent to the upper and front and rear edges each have an aligned row of male snaps. Next provided is a supplemental border. The supplemental border is in an inverted U-shaped configuration. The supplemental border has a front edge permanently secured to the front left tube. The supplemental border also has a free top edge. The supplemental border also has a free rear edge. A plurality of aligned spaced female snaps are provided on the top edge and rear edge. The female snaps are adapted to removably couple with the male snaps of the left screen. Next provided are a plurality of straps. A supplemental row of aligned female snaps are provided along the rear edge of the supplemental border. The straps have right ends permanently secured to the rear edge of the peripheral border of the right screen. The straps also have male snaps 98 secured to the left ends of the straps adapted to releasably couple to the supplemental row of female snaps of the supplemental border. In this manner releasable securement of the screen and posts and tubes with respect to the front right passenger seat of a vehicle is effected. Lastly, in the primary embodiment of the invention, a tubular container is provided. The tubular container supports the system when removed and rolled up in order to facilitate storage and transportation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved car seat netting system which has all of the advantages of the prior art car safety systems of known designs and configurations and none of the disadvantages.

It is another object of the present invention to provide a new and improved car seat netting system which may be easily and efficiently manufactured and marketed.

It is further object of the present invention to provide a new and improved car seat netting system which is of durable and reliable constructions.

An even further object of the present invention is to provide a new and improved car seat netting system which is susceptible of a low cost of manufacture with regard to both materials and labor, and which accordingly is then susceptible of low prices of sale to the consuming public, thereby making such car seat netting system economically available to the buying public.

Even still another object of the present invention is to provide a car seat netting system for precluding inadvertent movement of objects on the front right passenger seat of a vehicle.

Lastly, it is an object of the present invention to provide a new and improved car seat netting system. The system has a pair of front posts each having a lower tube with an upper tube adjustably positioned about the lower tube. The tubes are positionable adjacent the front left corner and front right corner of the front right passenger seat of a vehicle. The left side edge of a front screen is secured to the upper left tube and the right edge is secured to the upper right tube. The front edge of a right screen is permanently secured to the upper right tube. The upper, front and rear edges of a left screen have an aligned row of snaps. A supplemental border in an inverted U-shaped configuration has a front edge permanently secured to the front left tube and a free top edge and rear edge with a plurality of aligned spaced snaps adapted to removably couple with the snaps of the left screen and a supplemental row of aligned snaps along the rear edge of the supplemental border. A plurality of straps have right ends permanently secured to the rear edge of the right screen. Snaps secured to the left ends of the straps are adapted to releasably couple to the supplemental row of snaps of the supplemental border.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other go than those set forth above will become apparent when consideration is given to the following detailed description thereof. Such description makes reference to the annexed drawings wherein:

FIG. 1 is a perspective illustration of the new and improved car seat netting system constructed in accordance with the principles of the present invention.

FIG. 2 is a rear elevational view taken along line 2—2 of FIG. 1.

FIG. 3 is a side elevational view of the system shown in FIG. 1 taken along line 3—3 of FIG. 1 with the left side net in a partially released orientation.

FIG. 4 is an exploded perspective view of the system shown in the prior Figures but in a racked orientation with a receiving tubular cover for transportation and storage purposes.

The same reference numerals refer to the same parts throughout the various Figures.

DESCRIPTION OF THE PREFERRED EMBODIMENT

Figure 5:
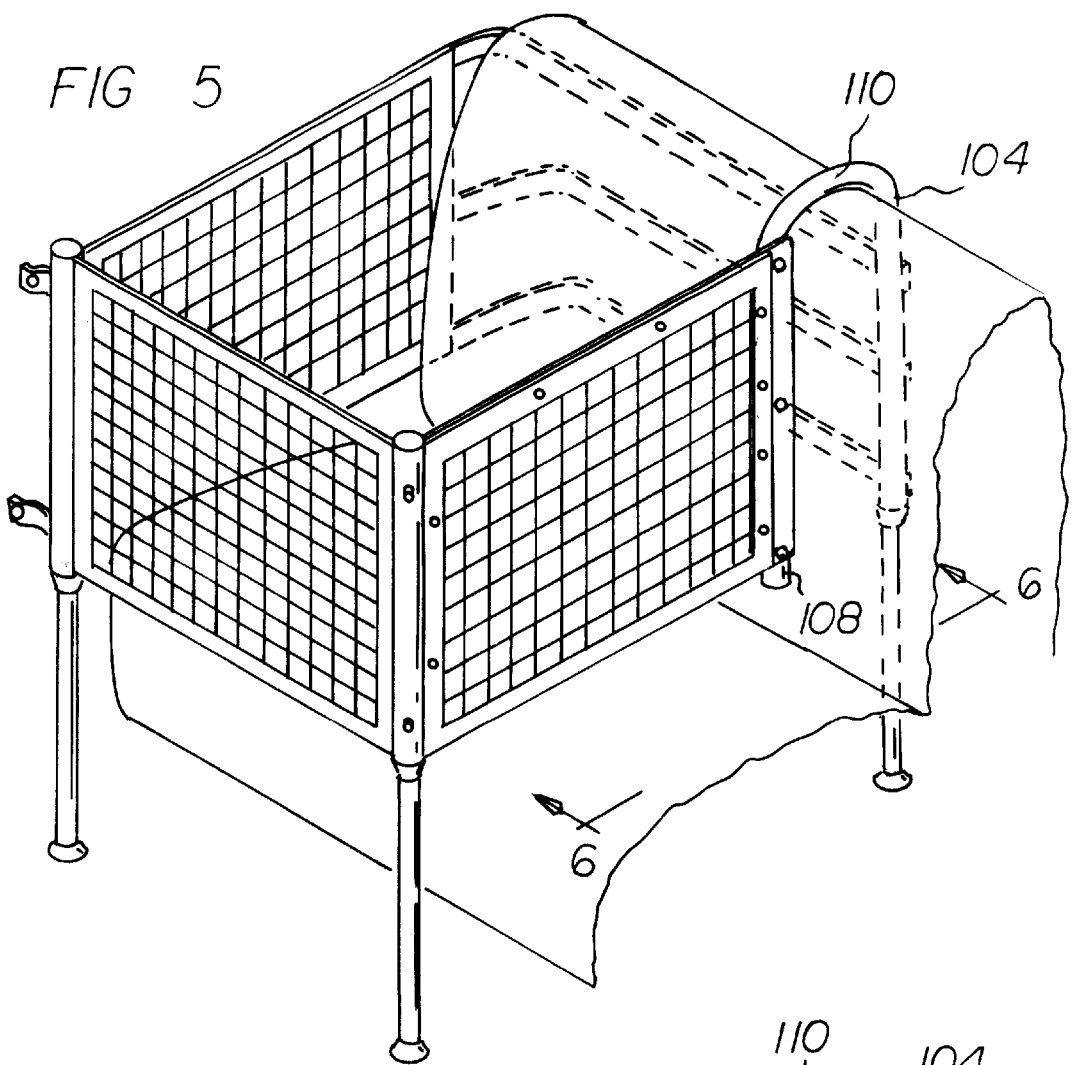
FIG. 5 is a perspective illustration similar to FIG. 1 but illustrating an alternate embodiment of the invention designed for use on the front right passenger seat of a vehicle equipped with a bench type seat.
Figure 6:
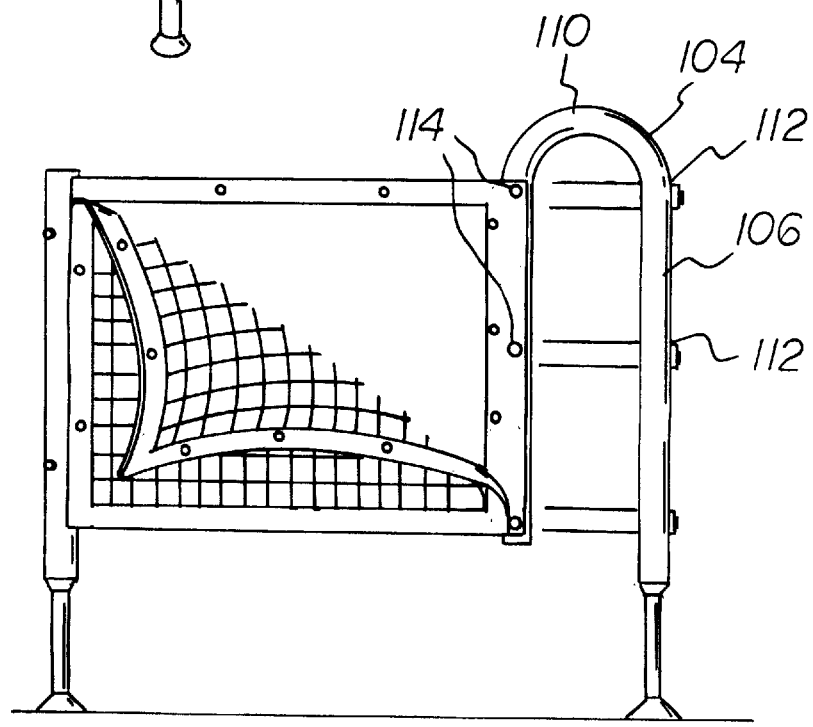
FIG. 6 is a left side elevational view taken along line 6—6 of FIG. 5.

With reference now to the drawings, and in particular to FIG. 1 thereof, the preferred embodiment of the new and improved car seat netting system embodying the principles and concepts of the present invention and generally designated by the reference numeral 10 will be described.

The present invention, the car seat netting system 10 is comprised of a plurality of components. Such components in their broadest context include a pair of front posts, a front screen, a right screen, a left screen, a supplemental border, and a plurality of straps. Such components are individually configured and correlated with respect to each other so as to attain the desired objective.

First provided are a pair of front posts 16, 18. Each front post has a lower tube 20. The lower tube has a support foot 22 at the lower end 24. The lower tube also has a top end 26. Each front post also has an upper tube 28, 30 adjustably positioned about the lower tube. A plurality of circular apertures 32 are located through each upper tube at spaced locations. An associated spring urged button 34 extends through the apertures to secure the upper tube at a predetermined height with respect to the lower tube. The tubes are positionable adjacent the front left corner and front right corner of the front right passenger seat of a vehicle.

Next provided is a front screen 38. The front screen is in a rectangular configuration. The front screen has an imperforate peripheral border 40 forming a lower edge 42 and an upper edge 44 and parallel side edges 46, 48 between the upper and lower edges. The side edges include a left side edge 46 permanently secured to the upper left tube 30. The side edges also include a right edge 48 permanently secured to the upper right tube 28. The front screen is positioned between the lower edge, upper edge and side edges.

Next provided is a right screen 52. The right screen is in a rectangular configuration. The right screen has an imperforate peripheral border 54. The peripheral border of the right screen has an upper edge 56, a lower edge 58, a front edge 60, and a rear edge 62. The front edge is permanently secured to the upper right tube 28.

Next provided is a left screen 66. The left screen also has a peripheral border 68. The peripheral border of the left screen has an upper edge 70, a lower edge 72, a front edge 74, and a rear edge 76. The borders adjacent to the upper and front and rear edges each have an aligned row of male snaps 78.

Next provided is a supplemental border 82. The supplemental border is in an inverted U-shaped configuration. The supplemental border has a front edge 84 permanently secured to the front left tube. The supplemental border also has a free top edge 86. The supplemental border also has a free rear edge 88. A plurality of aligned spaced female snaps 90 are provided on the front edge, top edge and rear edge. The female snaps are adapted to removably couple with the male snaps of the left screen. A supplemental row of aligned female snaps 92 are provided along the rear edge of the supplemental border.

Next provided are a plurality of straps 96. The straps have right ends permanently secured to the rear edge of the peripheral border of the right screen. The straps also have male snaps 98 secured to the left ends of the straps adapted to releasably couple to the supplemental row of female snaps of the supplemental border. In this manner releasable securement of the screen and posts and tubes with respect to the front right passenger seat of a vehicle is effected.

Lastly, in the primary embodiment of the invention, a tubular container 100 is provided. The tubular container supports the system when removed and rolled up in order to facilitate storage and transportation.

In an alternate embodiment of the invention, adapted for use in a vehicle with a bench-type seat, an inverted U-shaped tube 104 is provided. The tube has a rear extent 106 positionable behind a bench-type seat and a front extent 108 positionable in front of the back rest of a bench type seat. The tube has a curved extent 110 between the rear and front extents. The rear extent has snaps 112 for releasably coupling to the snaps of the straps. The front extent also has snaps 114 for releasably coupling to the snaps of the supplemental border.

To use the system on an individual seat, a plastic leg will be placed at each of the front corners of the passenger seat. The installer will adjust the height of the legs so that the bottom of the netting will be approximately one inch below the top edge of the seat. The netting will then be tightened into place by outstretching each of the side pieces along the sides of the seat and attaching the right and left side netting to each other by way of the three straps already permanently fastened to the right net. The three straps will wrap around the back of the seat and then snap into the snap receivers already permanently attached to the edge of the left side of the netting. If the netting along the left side is not wanted, at the top of the left side of the netting will be two snaps attaching the netting to the top left side netting strap. By unsnapping these snaps, and the middle snap along the left edge, the left side of the netting can be lowered.

To use the system in a vehicle with bench seat, a plastic leg will be placed at the front right corner of the bench seat. The second leg will be placed in front of the bench seat. The user will adjust the height of the legs so that the bottom of the netting will be approximately one inch below the to edge of the seat. The hooked tube will be attached to the bench seat. The netting will then be tightened into place by outstretching the pieces around the bench seat and then attaching the netting closest to the driver's side to the tube hanging over the bench seat. If the netting along the left side is not wanted, at the top of the left side of the netting will be two snaps attaching the netting to the top left side netting strap. By unsnapping these snaps, and the middle snap along the left edge, the left side of the netting can be lowered.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A car seat netting system for precluding inadvertent movement of objects on the front right passenger seat of a vehicle comprising, in combination:

a pair of front posts each having a lower tube with a support foot at the lower end and a top end and with an upper tube adjustable positioned about the lower tube, a plurality of circular apertures located through each upper tube at spaced locations with an associated spring urged button 34 extending there through to secure the upper tube at a predetermined height with respect to the lower tube, the tubes being positionable adjacent the front left corner and front right corner of the front right passenger seat of a vehicle;

a front screen in a rectangular configuration with an imperforate peripheral border forming a lower edge and an upper edge and parallel side edges there between, the side edges including a left side edge permanently secured to the upper left tube and the right edge being secured to the upper right tube with the front screen there between;

a right screen in a rectangular configuration with an imperforate peripheral border there around, the periphery including an upper edge, a lower edge, a front edge, and a rear edge, the front edge being permanently secured to the upper right tube;

a left screen with a peripheral border having an upper edge and a lower edge and a front edge and a rear edge, the border adjacent to the upper and front and rear edges each having an aligned row of male snaps;

a supplemental border in an inverted U-shaped configuration having a front edge permanently secured to the front left tube and a free top edge and rear edge with a plurality of aligned spaced female snaps adapted to removably couple with the male snaps of the left screen and a supplemental row of aligned female snaps along the rear edge of the supplemental border;

a plurality of straps having right ends permanently secured to the rear edge of the peripheral border of the right screen and with male snaps secured to the left ends of the straps adapted to releasably couple to the supplemental row of female snaps of the supplemental border for the releasable securement of the screen and posts and tubes with respect to the front right passenger seat of a vehicle; and a tubular container for supporting the system when removed and rolled up in order to facilitate storage and transportation.

2. A car seat netting system comprising:

a pair of front posts each having a lower tube with an upper tube adjustably positioned about the lower tube, the tubes being positionable adjacent the front left corner and front right corner of the front right passenger seat of a vehicle;

a front screen including a left side edge secured to the upper left tube and the right edge being secured to the upper right tube;

a right screen including an upper edge, a lower edge, a front edge, and a rear edge, the front edge being permanently secured to the upper right tube;

a left screen having an upper edge and a lower edge and a front edge and a rear edge, the upper and front and rear edges each having an aligned row of snaps;

a supplemental border in an inverted U-shaped configuration having a front edge permanently secured to the front left tube and a free top edge and rear edge with a plurality of aligned spaced snaps adapted to removably couple with the snaps of the left screen and a supplemental row of aligned snaps along the rear edge of the supplemental border; and a plurality of straps having right ends permanently secured to the rear edge of the right screen and with snaps secured to the left ends of the straps adapted to releasably couple to the supplemental row of snaps of the supplemental border.

3. The system as set forth in claim 2 wherein the snaps of the straps couple directly to the supplemental row of snaps of the supplemental border.

4. The system as set forth in claim 2 and further including an inverted U-shaped tube with a rear extent positionable behind a bench-type seat and a front extent positionable in front of the back rest of a bench type seat and a curved extent there between, the rear extent having snaps for releasably coupling to the snaps of the straps and the front extent having snaps for releasably coupling to the snaps of the supplemental border.

* * * * *